United States Patent
Wankmiller

(10) Patent No.: US 12,045,040 B2
(45) Date of Patent: Jul. 23, 2024

(54) GATEWAY, SYSTEM AND METHOD OF OPERATING A GATEWAY

(71) Applicant: Festo SE & Co. KG, Esslingen (DE)

(72) Inventor: Sven Wankmiller, Albershausen (DE)

(73) Assignee: Festo SE & Co. KG, Esslingen (DE)

( * ) Notice: Subject to any disclaimer, the term of this patent is extended or adjusted under 35 U.S.C. 154(b) by 311 days.

(21) Appl. No.: 17/328,431

(22) Filed: May 24, 2021

(65) Prior Publication Data

US 2022/0121180 A1    Apr. 21, 2022

(30) Foreign Application Priority Data

Oct. 19, 2020    (DE) .................. 102020213145.7

(51) Int. Cl.
*G05B 19/418* (2006.01)
*H04L 12/66* (2006.01)
(Continued)

(52) U.S. Cl.
CPC ........ *G05B 19/41855* (2013.01); *H04L 12/66* (2013.01); *H04L 67/125* (2013.01);
(Continued)

(58) Field of Classification Search
CPC .... G05B 19/41855; G05B 2219/25399; G05B 2219/25428; H04L 12/66; H04L 67/125; H04L 67/56; H04L 67/62
See application file for complete search history.

(56) References Cited

U.S. PATENT DOCUMENTS

2008/0294771 A1    11/2008 Hermes et al.
2013/0211555 A1    8/2013 Lawson et al.
(Continued)

FOREIGN PATENT DOCUMENTS

CN    110573975 A    12/2019
CN    111373702 A    7/2020
(Continued)

OTHER PUBLICATIONS

Benedick et al., "Trident: A Three-Steps Strategy to Digitise an Industrial System for Stepping into Industry 4.0". IECON 2019—45th Annual Conference of the IEEE Industrial Electronics Society, Oct. 14-17, 2019, Conference Location: Lisbon, Portugal. DOI: 10.1109/IECON.2019.8927010.
(Continued)

*Primary Examiner* — Charles R Kasenge
(74) *Attorney, Agent, or Firm* — Hoffmann & Baron, LLP

(57) ABSTRACT

A gateway for retrieving telemetry data from a field device and for transmitting the retrieved telemetry data to a cloud server, wherein the gateway comprises a cloud communication component which is designed to specify periodic request points in time at which an internal gateway request for a current variable value of a variable of the telemetry data is to be made, as well as a field device communication component which is designed to carry out a variable retrieval of the current variable value from the field device at periodic retrieval points in time. The gateway is designed to set the phase of the periodic retrieval points in time relative to the periodic request points in time such that the respective current variable value has already been retrieved from the field device at the request point in time of this gateway request and is present in the field device communication component.

11 Claims, 4 Drawing Sheets

(51) Int. Cl.
*H04L 29/08* (2006.01)
*H04L 67/125* (2022.01)

(52) U.S. Cl.
CPC .............. *G05B 2219/25399* (2013.01); *G05B 2219/25428* (2013.01)

(56) References Cited

U.S. PATENT DOCUMENTS

| | | |
|---|---|---|
| 2014/0047064 A1 | 2/2014 | Maturana et al. |
| 2015/0281355 A1 | 10/2015 | Maturana et al. |
| 2015/0281356 A1 | 10/2015 | Maturana et al. |
| 2016/0036918 A1* | 2/2016 | Lee ................. H04L 47/762 370/230 |
| 2016/0313023 A1* | 10/2016 | Przybylski ............... F24F 11/63 |
| 2017/0041231 A1 | 2/2017 | Seed et al. |
| 2017/0187625 A1* | 6/2017 | Nolan .................... H04L 47/10 |
| 2017/0208139 A1 | 7/2017 | Li et al. |
| 2018/0059629 A1 | 3/2018 | Haridas et al. |
| 2019/0014048 A1 | 1/2019 | Krishna Singuru |
| 2019/0064787 A1 | 2/2019 | Maturana |
| 2020/0387136 A1 | 12/2020 | Pöschmann et al. |
| 2020/0389520 A1 | 12/2020 | Mayer et al. |

FOREIGN PATENT DOCUMENTS

| | | |
|---|---|---|
| WO | 2019101408 A1 | 10/2018 |
| WO | 2018192911 A1 | 3/2019 |

OTHER PUBLICATIONS

Dobaj et al., "A Microservice Architecture for the Industrial Internet-Of-Things". EuroPLoP '18: Proceedings of the 23rd European Conference on Pattern Languages of Programs, Jul. 4-8, 2018, Conference Location: Irsee, Germany. DOI: 10.1145/3282308. 3282320.

Lucas-Estan et al., "Communication and Data Management in Industry 4.0". Chapter 5 in: "The Digital Shopfloor—Industrial Automation in the Industry 4.0 Era: Performance Analysis and Applications". River Publishers, 2019. ISBN: 9788770220415.

Sisinni et al., "Industrial Internet of Things: Challenges, Opportunities, and Directions". IEEE Transactions on Industrial Informatics, vol. 14, No. 11, Nov. 2018, pp. 4724-4734. DOI: 10.1109/TII. 2018.2852491.

Wang, "Migration strategy of cloud collaborative computing for delay-sensitive industrial IoT applications in the context of intelligent manufacturing". Elsevier, Computer Communications, vol. 150, Jan. 15, 2020, pp. 413-420. DOI: 10.1016/j.comcom.2019.12. 014.

Wang et al., "Toward Cloud-Assisted Industrial IoT Platform for Large-Scale Continuous Condition Monitoring". Proceedings of the IEEE, vol. 107, No. 6, Jun. 2019. DOI: 10.1109/JPROC.2019. 2914021.

Chinese Office Action dated Mar. 18, 2024.

\* cited by examiner

GATEWAY, SYSTEM AND METHOD OF OPERATING A GATEWAY

BACKGROUND OF THE INVENTION

The invention relates to a gateway for retrieving telemetry data from a field device and for transmitting the retrieved telemetry data to a cloud server, wherein the gateway comprises a cloud communication component which is designed to specify periodic request points in time at which an internal gateway request for a current variable value of a variable of the telemetry data is made, and to transmit the current variable value which is provided in response to the internal gateway request to the cloud server. The request points in time may also be referred to as request times.

The gateway further comprises a field device communication component which is designed to carry out a variable retrieval of the current variable value from the field device and to make the current variable value which is received with the variable retrieval available to the cloud communication component.

Conventionally, the variable retrieval is activated by the internal gateway request, so that the field device communication component does not begin with the variable retrieval until after the respective gateway request. Latencies on communication between the gateway and the field device can occur, so that the variable retrieval can take a certain amount of time and the current variable value of the requested variables can therefore not be provided immediately upon the gateway request.

SUMMARY OF THE INVENTION

An object of the invention lies in rapidly making the current variable value available to the cloud communication component. Preferably, the cloud communication component is not to be modified for this.

The object is achieved by a gateway for retrieving telemetry data from a field device and for transmitting the retrieved telemetry data to a cloud server, wherein the gateway comprises a cloud communication component which is designed to specify periodic request points in time at which an internal gateway request for a current variable value of a variable of the telemetry data is made, and to transmit the current variable value which is provided in response to the internal gateway request to the cloud server. The gateway further comprises a field device communication component which is designed to carry out a variable retrieval of the current variable value from the field device and to make the current variable value which is received with the variable retrieval available to the cloud communication component. The field device communication component of the gateway is designed to carry out a variable retrieval of the current variable value from the field device at periodic retrieval points in time and to provide the current variable value which is received with the variable retrieval to the cloud communication component in response to the gateway request. The retrieval points in time may also be referred to as retrieval times. Expediently therefore, the variable retrieval is no longer activated by the respective gateway request, but instead is carried out periodically (in particular independently of the respective gateway request). The gateway requests and the variable retrievals are therefore in particular decoupled in a manner such that the variable retrievals are not activated by the gateway requests. In particular, the gateways requests and the variable retrievals take place concurrently.

The gateway is designed to set the phase of the periodic retrieval points in time relative to the periodic request points in time such that the respective current variable value which the field device communication component provides to the cloud communication component upon the respective gateway request has already been retrieved from the field device at the request point in time of this gateway request and is present in the field device communication component. The variable retrievals are placed temporally before the respective gateway requests. The field device communication component therefore carries out each variable retrieval temporally before the respective gateway request. The respective variable retrieval is already completed at the point in time of each gateway request and the current variable value is already present in the field device communication component, so that the current variable value can be transmitted to the cloud communication component directly after the gateway request. The current variable value can therefore be made available to the cloud communication component very rapidly.

The invention further relates to a system, comprising a valve arrangement as well as the gateway, wherein the gateway is designed to retrieve the telemetry data from and/or via the valve arrangement.

The invention further relates to a method for operating a gateway for retrieving telemetry data from a field device and for transmitting the retrieved telemetry data to a cloud server, comprising the steps:

- by way of a cloud communication component of the gateway, setting periodic request points in time at which an internal gateway request for a current variable value of a variable of the telemetry data is made, and transmitting the current variable value which is provided in response to the internal gateway request to the cloud server,
- by way of a field device communication component, carrying out a variable retrieval of the current variable value from the field device at periodic retrieval points in time and providing the current variable value which is retrieved with the variable retrieval to the cloud communication component in response to the gateways request,
- setting the phase of the periodic retrieval points in time relative to the periodic request points in time such that the respective current variable value which the field device communication component provides to the cloud communication component upon the respective gateways request has already been retrieved from the field device at the request point in time of this gateway request and is present in the field device component.

Preferably, the method is carried out with the gateway which is described here.

BRIEF DESCRIPTION OF THE DRAWINGS

Further exemplary details as well as exemplary embodiments are explained hereinafter with reference to the figures. Herein are shown in.

DETAILED DESCRIPTION

Figure 1:
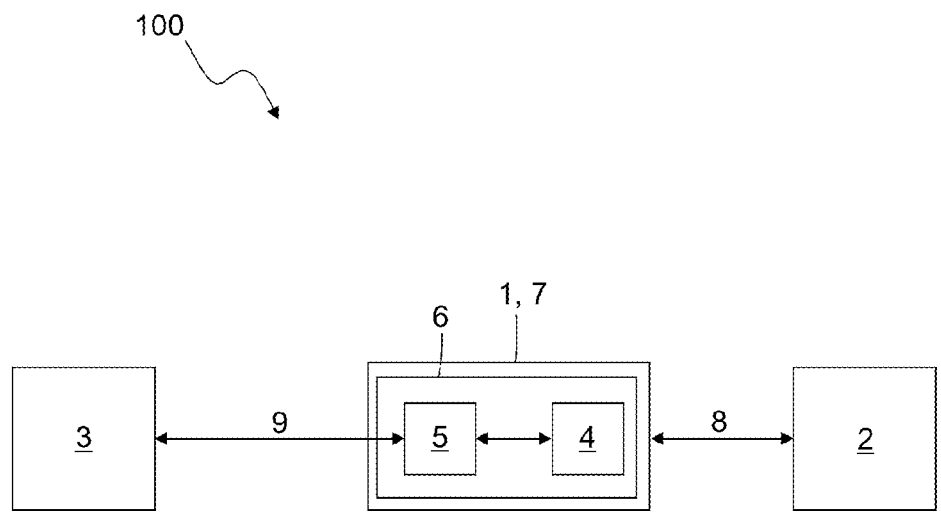
FIG. 1 a schematic representation of a system with a gateway, a field device and a cloud server, FIG. 2 an exemplary embodiment of the system with a valve arrangement, FIG. 3 an exemplary embodiment of the system, where the gateway is arranged on a carrier section of the valve arrangement, FIG. 4 two time diagrams in which request points in time and retrieval points in time are plotted, FIG. 5 a time diagram in which a temporal interval between a completion of a variable retrieval and a gate request is drawn, and FIG. 6 two time diagrams, in which request points in time and retrieval points in time of variables of different periodicity classes are plotted.

FIG. 1 shows a system 100 which comprises a gateway 1, a field device 2 and a cloud server 3. The system 100 is an exemplary application environment for the gateway 1. The gateway 2 can also be provided by itself—thus without the field device 2 and/or the cloud server 3. In particular, the gateway 1 is designed for industrial application, for example for use in industry automation. Usefully, the gateway 1 is an Internet-of-Things gateway. According to a possible embodiment, an industrial facility, in particular an industrial manufacturing facility, is provided, said facility comprising the gateway 1, the field device 2 and/or the cloud server 3.

The gateway 1 serves for retrieving telemetry data from the field device 2 and for transmitting the retrieved telemetry data to the cloud server 3. The telemetry data comprises one or more variables which for example represent a state of the field device 2. In particular, the one or more variables are state variables. For example, the variables represent a motor current and/or a temperature. By way of example, the telemetry data comprises at least 10, at least 20 or at least 30 variables. The field device 2 in particular comprises an actuator unit, for example a valve unit, and/or a sensor unit.

The gateway 1 comprises a field device communication component 4 and a cloud communication component 5 which are each preferably designed as a software component. By way of example, the gateway 1 has a computation unit 6, for example a microcontroller, and the field device communication component 4 and/or the cloud communication component 5 is carried out on the computation unit 6. The field device communication component 4 controls the communication of the gateway 1 with the field device 2. The cloud communication component 5 controls the communication of the gateway 1 with the cloud server 3.

In particular, the gateway 1 is designed as a gateway module with a gateway module housing 7, in which preferably the computation unit 6 is arranged. The gateway 1 is communicatively connected to the field device 2 via a field device communication connection 8, for example a bus, in particular a field bus. The gateway 1 is connected to the cloud server 3 via a cloud communication connection 9, for example a wide area network, in particular the internet.

For example, the gateway 1 is designed to carry out a packet-based communication with the field device 2, in particular on the basis of TCP/IP or UD/IP, usefully via Ethernet or tunnelled in a field bus, e.g. Ethercat. Furthermore, the communication between the gateway 1 and the field device 2 can be effected parallel to Profinet, in particular in a non-tunnelled manner.

The telemetry data preferably serves for the pure monitoring and in particular comprises no control commands. The field device 2 expediently transmits and/or receives process data, in particular control commands, parallel to the telemetry data. The process data and the telemetry data are expediently transmitted via the same field device communication connection 8.

The cloud server 3 is expediently arranged at a geographic location other than the gateway 1 and/or the field device 2. The field device 2 (and optionally the gateway 1) is arranged in the field level.

In particular, the gateway 1 is designed to communicate with the field device 2 according to a first communication protocol and to communicate with the cloud server with a second communication protocol which is different to the first communication protocol. The gateway 1 preferably carries out a protocol conversion between the first communication protocol and the second communication protocol. The first and/or the second communication protocol can be for example an Internet-of-Things communication protocol.

Figure 2:
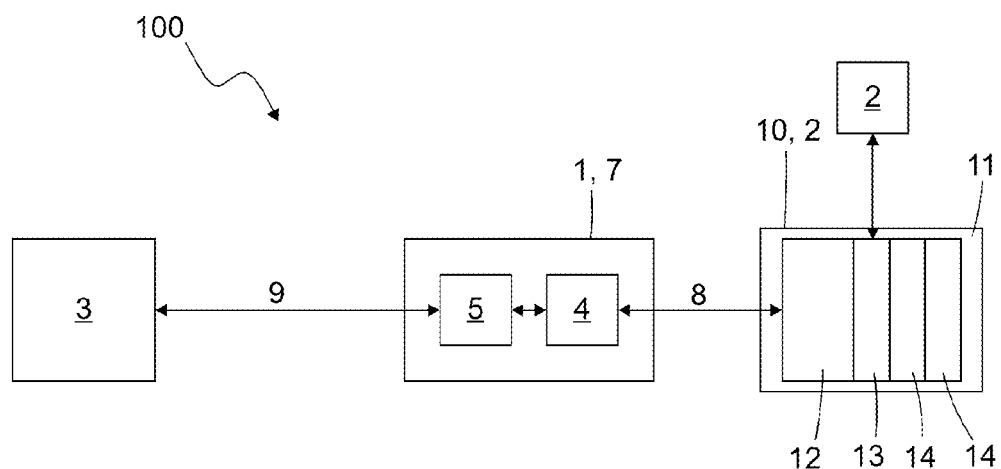

FIG. 2 shows an exemplary further development of the system 100 with a valve arrangement 10. The explanations which relate to FIG. 1 expediently also apply to FIG. 2.

The valve arrangement 10 can represent the field device 2. The valve arrangement 10 in particular is designed as a valve terminal. By way of example, the valve arrangement 10 comprises a carrier section 11 and several modules which are arranged on the carrier section 11. The modules for example comprise a control module 12 and/or an I/O module 13 and/or one or more valve modules 14. The gateway 1 receives the one or more variables, in particular from the valve arrangement 10, preferably from the control module 12, the I/O module 13 and/or one or more valve modules 14. The gateway 1 is designed to retrieve the telemetry data from the valve arrangement 10.

Optionally, the system 100 can further comprise a field device 2 which via the valve arrangement 10, in particular via the I/O module and/or via the control module 12, is communicatively connected to the gateway 1. The gateway 1 is designed to retrieve the telemetry data from the field device 2 via the valve arrangement 10.

By way of example, the gateway 1 is not arranged on the carrier section 11. In particular, the gateway 1 is arranged distanced to the valve arrangement 10, in particular distanced to the carrier section 11. The gateway 1 is communicatively connected to the valve arrangement 10, for example via a cable.

Figure 3:
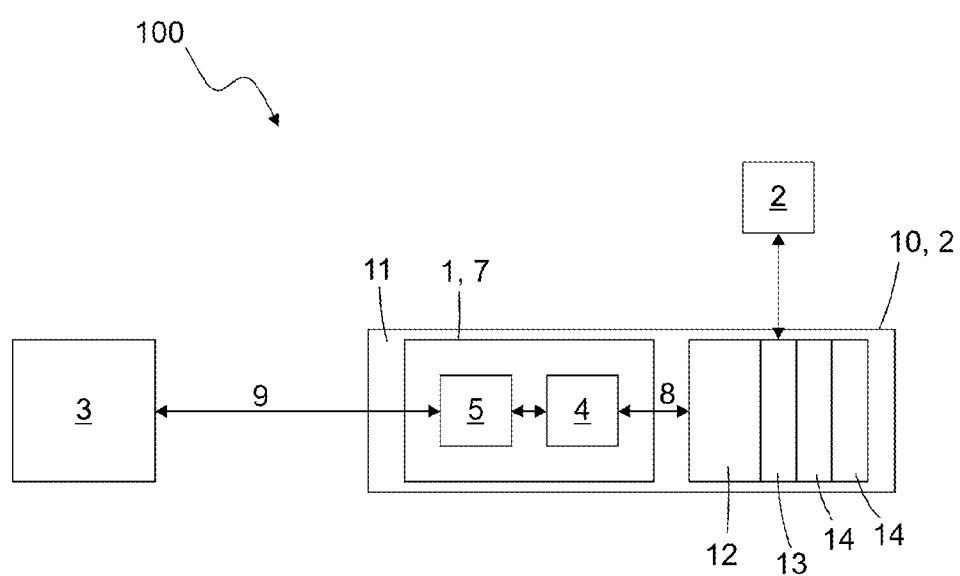

FIG. 3 shows a further exemplary development of the system 100. The gateway 1 is arranged on the carrier section 11 of the valve arrangement 10 in FIG. 3. The gateway 1 in particular is designed as a gateway module. Otherwise, the system 100 which is shown in FIG. 3 is expediently designed as the previously explained system 100 which is show in FIG. 2.

Figure 4:
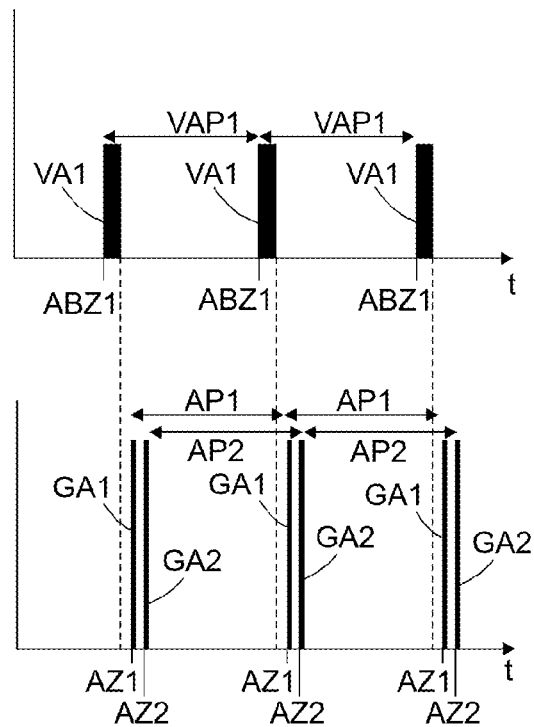

The cloud communication component 5 and the field device communication component 4 are to be dealt with in more detail with reference to FIG. 4.

The cloud communication component 5 is designed to set periodic request points in time at which an internal gateway request for a current variable value of a variable of the telemetry data is to be made, and to transmit the current variable value which is provided in response to the internal gateway request, to the cloud server. Preferably, the cloud communication component 5 requests current variable values of several variables. By way of example, the current variable values of at least two variables are requested.

The cloud communication component 5 preferably specifies several request sequences, wherein each request sequence is assigned to a respective variable. Each request sequence comprises respective periodic request points in time at which an internal gateway request for a current variable value of the assigned variable is made. By way of example, the cloud communication component 5 specifies a first request sequence which is assigned to a first variable and which comprises first periodic request points in time AZ1 at which a first internal gateway request GA1 for a current variable value of the first variable is made. Furthermore, the cloud communication component 5 by way of example comprises a second request sequence which is assigned to a second variable and comprises second periodic request points in time AZ2 at which a second internal gateway request GA2 for a current variable value of the second variable is made.

Preferably, the cloud communication component 5 can specify one or more further request sequences which are assigned to a respective variable and define respective periodic request points in time at which a respective gateway request for a current value of the assigned variable is made. For example, the cloud communication component 5 specifies at least 10, at least 20 or at least 30 request sequences.

By way of example, the gateway requests are made sequentially, in particular in a manner such that directly consecutive gateway requests relate to different variables.

The gateway requests are preferably made from the cloud communication component 5 to the field device communication component 4. Alternately or additionally, the cloud communication component 5 can provide to the field device communication component 4 point in time information in which the request points in time are specified. The field device communication component 4 can make the gateway request itself on the basis of the point in time information.

The request points in time have a respective request period. By way of example, the first request points in times AZ1 have a first request period AP1 and/or the second request points in time AZ2 have a second request period AP2. By way of example, the first request period AP1 is equal to the second request period AP2. Alternatively, the first request period AP1 can be different from the second request period AP2. By way of example, the second request sequence is phase-shifted to the first request sequence.

The field device communication component 4 is designed, as a response to each internal gateway request GA1, GA2, to make the respective current variable value of the respective variable available to the cloud communication component 5.

The cloud communication component 5 is designed to transmit, to the cloud server 3, the respective current variable value which is provided in response to each internal gateway request GA1, GA2.

The field device communication component 4 is designed to carry out, at periodic retrieval points in time ABZ1, a variable retrieval VA1 of one or more current variable values from the field device 2. Each variable retrieval VA1 comprises a field device request from the gateway 1 to the field device 2. The field device request specifies one or more variables for which the field device 2 is to provide one or more current variable values. Each variable retrieval VA1 further comprises a field device response from the field device 2 to the gateway 1. The field device response comprises one or more current variable values. The periodic retrieval points in time ABZ1 have a retrieval period VAP1.

The field device communication component 4 is designed to provide a respective current variable value which is received with the variable retrieval VA1 to the cloud communication component 5 in response to the respective gateway request. By way of example, the field device communication component 4 is designed to provide a first current variable value of the first variable, which (first current variable value) is received with the first variable retrieval VA1, to the cloud communication component 5 in response to the first gateway request GA1. Furthermore, the field device communication component 4 by way of example is designed to provide a second current variable value of the second variable, which (second current variable value) is received with the variable retrieval VA, to the cloud communication component 5 in response to the second gateway request GA2.

The gateway 1 is designed to set the phase of the periodic retrieval points in time ABZ1 relative to the periodic request points in time AZ1, AZ2 such that the respective current variable value which the field device communication component 4 provides to the cloud communication component 5 in response to the respective gateway request GA1, GA2, has already been retrieved from the field device 2 at the gateway request point in time of this gateway request GA1, GA2 and is present in the field device communication component 4. In particular, what is meant by the term phase is the temporal interval or the temporal shift between the retrieval points in time ABZ1 and the first request points in time AZ1.

Therefore, the variable retrieval VA1 takes place first, in which variable retrieval VA1 the field device communication component 4 retrieves the current variable values of the variables from the field device 2, and only thereafter does the cloud communication component 5 make the internal gateway requests GA1, GA2 to the field device communication component 4, these internal gateway requests GA1, GA2 having the effect that the field device communication component 4 provides the already retrieved current variable values to the cloud communication component 5. By way of example, after each variable retrieval VA1, a plurality of gateway requests GA1, GA2 for the current variable values which are retrieved with the respective variable retrieval are made sequentially. A complete sequence results, in which complete sequence the variable retrievals VA1 and the sequential gateway requests GA1, GA2 are effected alternately.

The field device communication component 4 is thus designed to carry out a "prefetching" of the current variable values.

The gateway 1 is preferably designed to intermediately store the retrieved current variable values in a memory, in particular a working memory, of the gateway 1, expediently between the variable retrieval and the gateway requests. In particular, the gateway 1 is designed to carry out a caching of the retrieved current variable values.

By using a caching method in the data acquisition via the latency-burdened field device communication connection 8 (for example a field network), it becomes possible to have the current variable values ready before making the respective gateway requests.

Expediently, the field device communication component 4 is designed, in the case that a variable retrieval is not yet completed at the request point in time of the associated gateway request (for example on account of latencies of the field device communication component 8), to provide an older variable value to the cloud communication component 5 in response to the gateway request. The older variable value for example originates from a preceding variable retrieval.

Preferably, the field device communication component 4 is designed to detect a request period of the request points in time and to determine the phase and/or the retrieval period of the retrieval points in time on the basis of the detected request period. By way of example, the field device communication component 4 is designed to detect the request period by way of a time measurement, for example by way of measuring the temporal interval between consecutive request points in time of a request sequence. In particular, the gateway 1 is designed to detect the request period of each variable at the running time by measuring.

Furthermore, the field device communication component 4 can be designed to detect the request period on the basis of period information. The period information preferably comprises the request period and is provided for example by the cloud communication component.

The field device communication component 4 preferably sets the retrieval period VAP1 to the detected first request period AP1.

The field device communication component 4 preferably detects the first request period AP1 continuously and continuously adapts the phase and/or retrieval period VAP1 on the basis of the detected first request period AP1.

The gateway 1 is preferably designed to carry out a closed-loop phase control of the phase of the periodic retrieval points in time ABZ1. In particular, the gateway is designed to closed-loop control the phase in order to minimise the temporal interval ZA between the completion of the respective variable retrieval VA and the subsequent gateway request GA1 upon which the current variable value which is retrieved with the variable retrieval VA is provided for the transmission to the cloud server.

Figure 5:
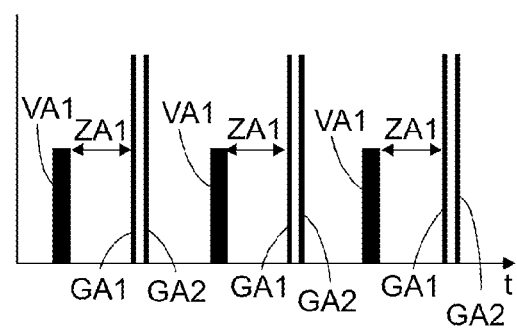

Preferably, the gateway 1 comprises a phase control loop which is implemented for example in software. The gateway 1 in particular is designed, amid usage of the phase control loop, to dynamically shift the periodic retrieval points in time ABZ1 at running time such that the temporal interval ZA1 is minimised. The temporal interval ZA1 is shown in FIG. 5. The temporal interval ZA1 can also be denoted as a data age of the retrieved variable values at the request point in time AZ1. Expediently, the temporal interval ZA1 is minimised to a minimal value, which in particular is larger than zero, for example 50 ms.

In particular, the field device communication component 4 is designed to set the phase such that the retrieval point in time ABZ1 is situated before the first associated request point in time AZ1 by at least a retrieval latency—thus by the time duration of the variable retrieval VA1. The retrieval point in time ABZ1 in particular is the starting point in time of the variable retrieval VA1.

Figure 6:
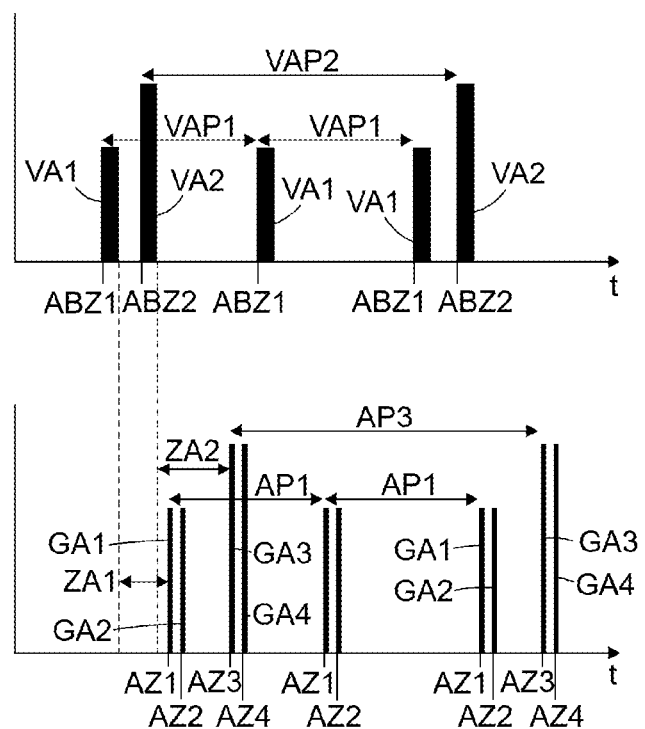

With reference to FIG. 6, an embodiment in which the cloud communication component 5 specifies request sequences with different request periods shall be discussed hereinafter. The aforementioned explanations which relate to the variable retrievals and the gateway requests of the first and second variables expediently apply accordingly to the subsequently explained embodiment, in particular for the first and second variable discussed there, and/or for the third and fourth variable.

The telemetry data comprises several different variables, by way of example four different variables. A respective request sequence with respective periodic request points in time is assigned to each of the several different variables. By way of example, a first request sequence with first periodic request points AZ1 in time is assigned to a first variable, a second request sequence with second periodic request points AZ2 in time is assigned to a second variable, a third request sequence with third periodic request points in time AZ3 is assigned to a third variable and a fourth request sequence with fourth periodic request points in time AZ4 is assigned to a fourth variable.

The cloud communication component 5 is designed, for each of the plural different variables, to make a respective gateway request for a respective current variable value at the respectively assigned request points in time. By way of example, the cloud communication component 5 makes for the first variable at the first request points in time AZ1 a respective first gateway request GA1 for the first current variable value, for the second variable at the second request points in time AZ2 a respective second gateway request GA2 for a second current variable value, for the third variable at the third request points in time AZ3 a respective third gateway request GA3 for a third current variable value, and for the fourth variable at the fourth request points in time AZ4 a respective fourth gateway request GA4 for a fourth current variable value.

The request sequences comprise request sequences which differ in their request periods. By way of example, the first request sequence differs in its request period from the third request sequence and from the fourth request sequence. Furthermore, the second request sequence differs in its request period from the third request sequence and from the fourth request sequence. By way of example, the first request sequence and/or the second request sequence has a first request period AP1 and the third request sequence and/or the fourth request sequence has a third request period AP3. The third sequence period AP3 is different from the first request period AP1, in particular is at least twice as large as the first request period AP1.

The gateway 1 is preferably designed to classify each variable into one of several different periodicity classes according to the request period of the respectively assigned request sequence, so that variables with the same request period belong to the same periodicity class. Expediently, the classification is such that each period is associated with only one periodicity class.

By way of example, the gateway 1 classifies the first variable and/or the second variable into a first periodicity class according to the first request period AP1. In particular, the gateway 1 detects that the first variable and the second variable have the same request period AP1, and classifies the first variable and the second variable into the first periodicity class on the basis of this detection.

By way of example, the gateway 1 classifies the third variable and/or the fourth variable into a second periodicity class according to the third request period AP3. In particular, the gateway 1 detects that the third variable and the fourth variable have the same request period AP1 and classifies the third variable and the fourth variable into the second periodicity class on the basis of this detection.

Variables with different request periods are classified by the gateway 1 into different periodicity classes. Thus, the gateway 1 classifies the first variable and/or the second variable into a different periodicity class than the third variable and/or the fourth variable.

The gateway 1 is preferably designed to constantly monitor the request periods, in particular at the running time, and, given a change of a request period, to carry out a reclassification of the associated variables. If the request period of a variable changes, then the variable is classified into a different periodicity class.

The field device communication component 4 is preferably designed to retrieve the current variable values of the variables of the same periodicity class from the field device 2 by way of a common variable retrieval. The common variable retrieval is preferably performed within a block transfer. By way of this, a latency reduction in comparison to the sum of latencies of individual retrievals can be achieved. A common variable retrieval is performed for example by way of the field device communication component outputting a field device request to the field device 2, wherein the field device request specifies several variables of the same periodicity class. The common field device request is for example a data telegram and/or a data packet. By way of example, the field device 2 in response to the common field device request transmits a common field device response, in which current variable values of several variables of the same periodicity class are contained. The common field device response is for example a data telegram and/or a data packet. The aforementioned data packet of the field device request and/or of the field device response in particular is a packet of the layer 5-7 of the OSI model. For example, the data packet is a sub-packet of a TCP/IP packet.

The field device communication component 4 preferably carries out an individual variable retrieval for each periodicity class. In particular, an individual common field device request and/or an individual common field device response is performed for each periodicity class.

By way of example, the field device communication component 4 carries out the variable retrievals of each periodicity class with an individual retrieval period. The retrieval period is expediently the same as the request period of the respective periodicity class.

In particular, the field device communication component 4 is designed to carry out individual variable retrievals for each periodicity class, so that the current variable values of variables of different periodicity classes are retrieved from the field device 2 by way of different variable retrievals. The field device communication component 4 preferably carries out the variable retrievals for each periodicity class at respective retrieval points in time. Individual retrieval points in time are assigned to each periodicity class.

By way of example, the field device communication component 4 retrieves the current variable values of the variables of the first periodicity class by way of first common variable retrievals VA1 which are each performed at first retrieval points in time. The current variable values of all variables of the first periodicity class are retrieved with each first common variable retrieval VA1. The first common variable retrievals VA1 are performed with a first retrieval period VAP1 which in particular is the same as the first request period AP1. Preferably, no variable values of variables which do not belong to the first periodicity class are retrieved with each first common variable retrieval VA1.

By way of example, the field device communication component 4 retrieves the current variable values of the variables of the second periodicity class by way of second common variable retrievals VA2 which are each effected at second retrieval points in time ABZ2. The current variable values of all variables of the second periodicity class are retrieved with each second common variable retrieval VA2. The second common variable retrievals VA2 are performed with a second retrieval period VAP2 which in particular is equal to the third request period AP3. The second retrieval period VAP2 is different to the first retrieval period VAP1, in particular at least twice as large as the first retrieval period. Preferably, no variable values of variables which do not belong to the two second periodicity class are retrieved with each second common variable retrieval VA2.

In correspondence to the first and second periodicity class which are discussed above, one or more further periodicity classes and accordingly further common variable retrievals with respective retrieval periods may be present.

By way of example, after each variable retrieval, sequentially a plurality of gateway requests for the current variable values which are retrieved with that variable retrieval are made. After each first variable retrieval VA1, the first and the second gateway requests GA1, GA2 are sequentially made. After each second variable retrieval VA2, the third and fourth gateway requests GA3, G4 are sequentially made.

The field device communication component 4 is preferably designed to set, for each periodicity class, the respective retrieval period, in particular to the request period of the associated request sequence.

Expediently, the field device communication component 4 is designed to adjust, for each periodicity class, the respective phase of the retrieval points in time relative to the request points in time.

The field device communication component 4 preferably continuously detects the request periods and adjusts the phases and/or the retrieval periods on the basis of the detected request periods.

The gateway 1 is preferably designed to carry out, for each periodicity class, a closed-loop phase control of the phase of the periodic retrieval points in time. In particular, the gateway 1 is designed to closed-loop control the phase for each periodicity class, in order to minimise the temporal interval between the completion of the respective variable retrieval and the subsequent gateway request upon which the current variable value which is retrieved with the variable retrieval is provided for transmission to the cloud server. By way of example, the gateway closed-loop controls the phase of the first periodic retrieval points in time ABZ1, so that a first temporal interval ZA1 between the completion of the respective first variable retrieval VA1 and the subsequent first gateway request GA1 is minimised. By way of example, the gateway closed-loop controls the phase of the second periodic retrieval points in time ABZ2 such that a second temporal interval ZA2 between the completion of the respective second variable retrieval VA1 and the subsequent third gateway request GA3 is minimized.

The request periods and/or the retrieval periods of the periodicity classes are preferably integer multiples of a minimum period which in particular is configured in the gateway 1. The minimum period can also be denoted as a periodicity resolution. The minimum period is for example 50 ms.

What is claimed is:

1. A gateway for retrieving telemetry data from a field device and for transmitting the retrieved telemetry data to a cloud server, wherein the gateway comprises a cloud communication component which is designed to specify periodic request points in time at which an internal gateway request for a current variable value of a variable of the telemetry data is to be made, and to transmit the current variable value which is provided in response to the internal gateway request to the cloud server, as well as a field device communication component which is designed to carry out a variable retrieval of the current variable value from the field device at periodic retrieval points in time and to make the current variable value which is received with the variable retrieval available to the cloud communication component in response to the gateway request, wherein the gateway is designed to set the phase of the periodic retrieval points in time relative to the periodic request points in time such that the respective current variable value which the field device communication component provides to the cloud communication component in response to the respective gateway request has already been retrieved from the field device at the request point in time of the gateway request and is present in the field device communication component, and
    wherein the phase is a temporal shift between the periodic retrieval points in time and the periodic request points in time, and
    wherein the gateway is designed to carry out a closed-loop phase control of the phase of the periodic retrieval points in time, wherein the gateway is designed, by way of the closed-loop phase control, to minimize the temporal interval between the completion of the respective variable retrieval and the subsequent gateway request in response to which the current variable value which is retrieved with the variable retrieval is provided for transmission to the cloud server.

2. The gateway according to claim 1, wherein the field device communication component is designed to detect a request period of the request points in time and to set the phase and/or the retrieval period of the retrieval points in time on the basis of the detected request period.

3. The gateway according to claim 1, wherein the telemetry data comprises a plurality of different variables and a respective request sequence with respective periodic request points in time is assigned to each of the plurality of different variables and wherein the cloud communication component is designed, for each of the plurality of different variables, to make a respective gateway request for a respective current variable value at the respectively assigned request points in time.

4. The gateway according to claim 3, wherein the request sequences have different request periods.

5. The gateway according to claim 4, wherein the gateway is designed to classify each variable into one of a plurality of different periodicity classes according to the request period of the respectively assigned request sequence, so that variables with the same request period belong to the same periodicity class.

6. The gateway according to claim 5, wherein the field device communication component is designed to retrieve the current variable values of the variables of the same periodicity class from the field device by way of a common variable retrieval.

7. The gateway according to claim 5, wherein the field device communication component is designed to carry out individual variable retrievals for each periodicity class, so that the current variable values of variables of different periodicity classes are retrieved from the field device by way of different variable retrievals.

8. The gateway according to claim 1, wherein the gateway is designed as a gateway module with a gateway module housing.

9. A system comprising a valve arrangement as well as a gateway for retrieving telemetry data from a field device and for transmitting the retrieved telemetry data to a cloud server, wherein the gateway comprises a cloud communication component which is designed to specify periodic request points in time at which an internal gateway request for a current variable value of a variable of the telemetry data is to be made, and to transmit the current variable value which is provided in response to the internal gateway request to the cloud server, as well as a field device communication component which is designed to carry out a variable retrieval of the current variable value from the field device at periodic retrieval points in time and to make the current variable value which is received with the variable retrieval available to the cloud communication component in response to the gateway request, wherein the gateway is designed to set the phase of the periodic retrieval points in time relative to the periodic request points in time such that the respective current variable value which the field device communication component provides to the cloud communication component in response to the respective gateway request has already been retrieved from the field device at the request point in time of this gateway request and is present in the field device communication component, wherein the gateway is designed to retrieve the telemetry data from and/or via the valve arrangement, and wherein the phase is a temporal shift between the periodic retrieval points in time and the periodic request points in time, and wherein the gateway is designed to carry out a closed-loop phase control of the phase of the periodic retrieval points in time, wherein the gateway is designed, by way of the closed-loop phase control, to minimize the temporal interval between the completion of the respective variable retrieval and the subsequent gateway request in response to which the current variable value which is retrieved with the variable retrieval is provided for transmission to the cloud server.

10. The system according to claim 9, wherein the valve arrangement comprises a carrier section and a plurality of modules which are arranged on the carrier section.

11. A method for operating a gateway for retrieving telemetry data from a field device and for transmitting the retrieved telemetry data to a cloud server, comprising the steps:

by way of a cloud communication component of the gateway, specifying periodic request points in time at which an internal gateway request for a current variable value of a variable of the telemetry data is to be made, and transmitting the current variable value which is provided in response to the internal gateway request to the cloud server, by way of a field device communication component, carrying out a variable retrieval of the current variable value from the field device at periodic retrieval points in time and making the current variable value which is retrieved with the variable retrieval available to the cloud communication component in response to the gateways request, setting the phase of the periodic retrieval points in time relative to the periodic request points in time such that the respective current variable value which the field device communication component makes available to the cloud communication component upon the respective gateways request has already been retrieved from the field device at the request point in time of this gateway request and is present in the field device component, wherein the phase is a temporal shift between the periodic retrieval points in time and the periodic request points in time, and wherein a closed-loop phase control of the phase of the periodic retrieval points in time is carried out, wherein, by way of the closed-loop phase control, the temporal interval is minimized between the completion of the respective variable retrieval and the subsequent gateway request in response to which the current variable value which is retrieved with the variable retrieval is provided for transmission to the cloud server.

* * * * *